Figure 9:
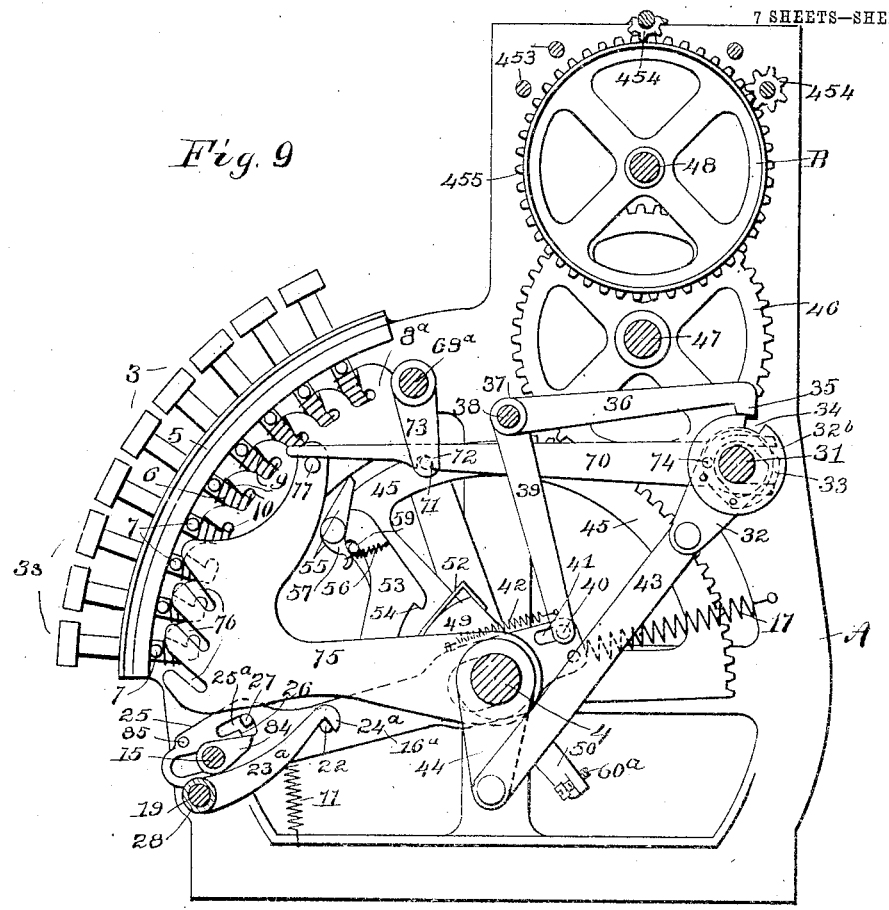

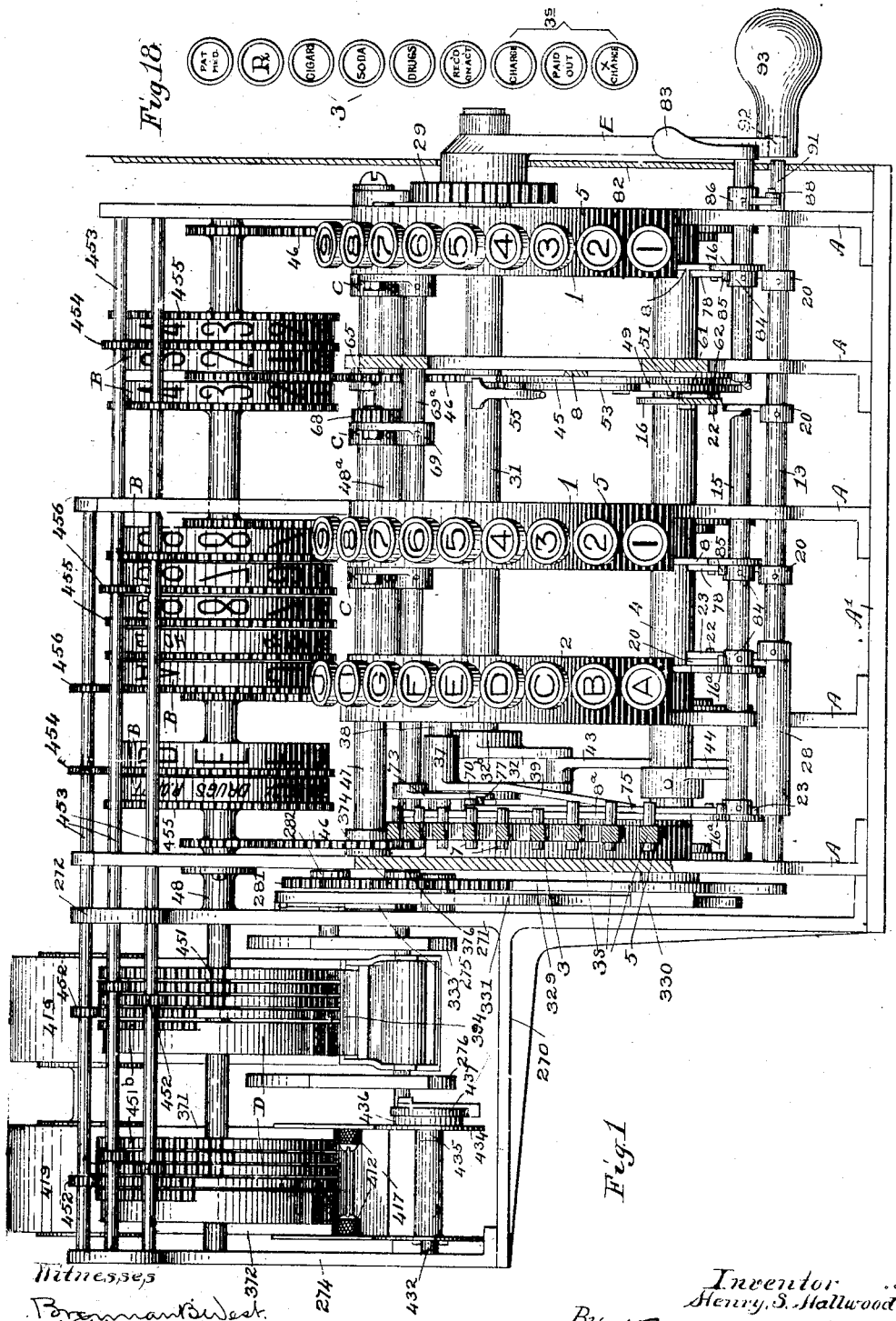

No. 845,634. PATENTED FEB. 26, 1907.
H. S. HALLWOOD.
CASH REGISTER.
APPLICATION FILED OCT. 22, 1906.
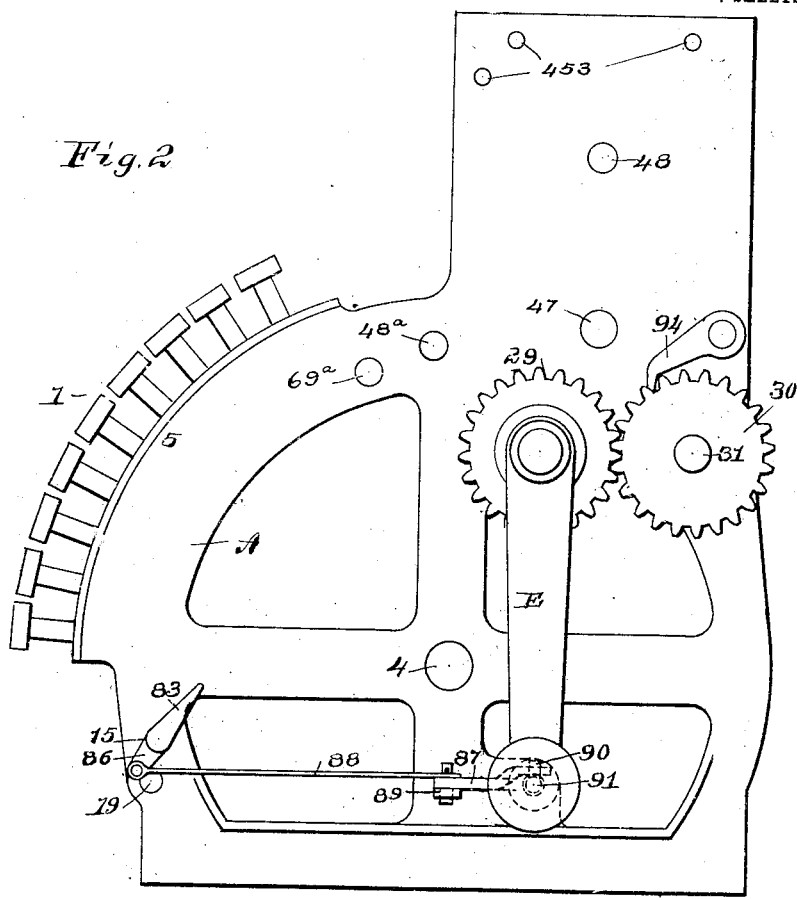
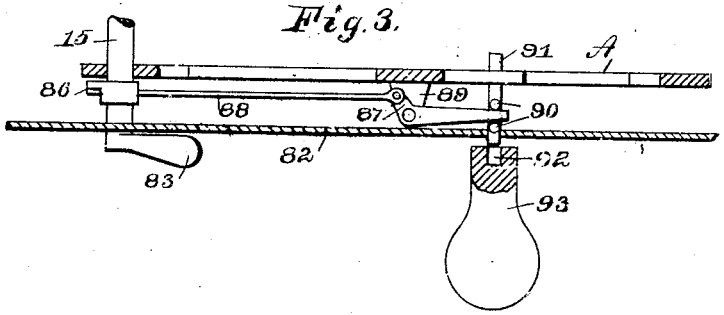
Witnesses
Inventor,
Henry S. Hallwood.

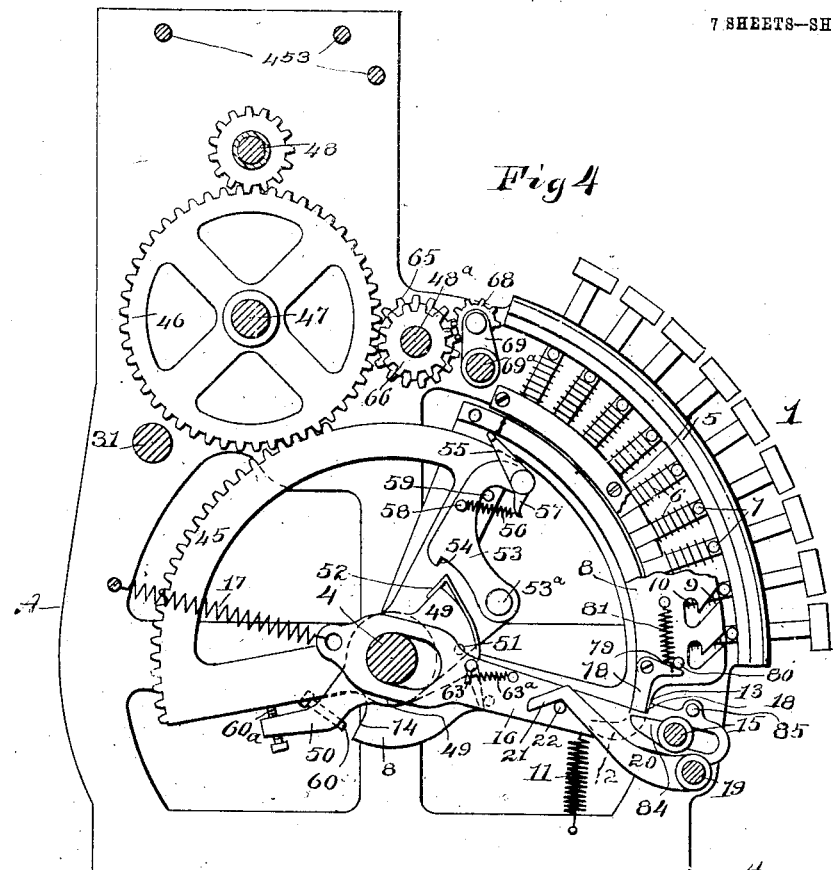

No. 845,634. PATENTED FEB. 26, 1907.
H. S. HALLWOOD.
CASH REGISTER.
APPLICATION FILED OCT. 22, 1906.
7 SHEETS—SHEET 4.
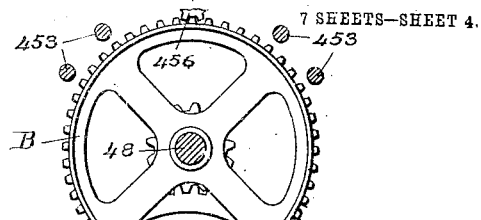
*Fig. 7*
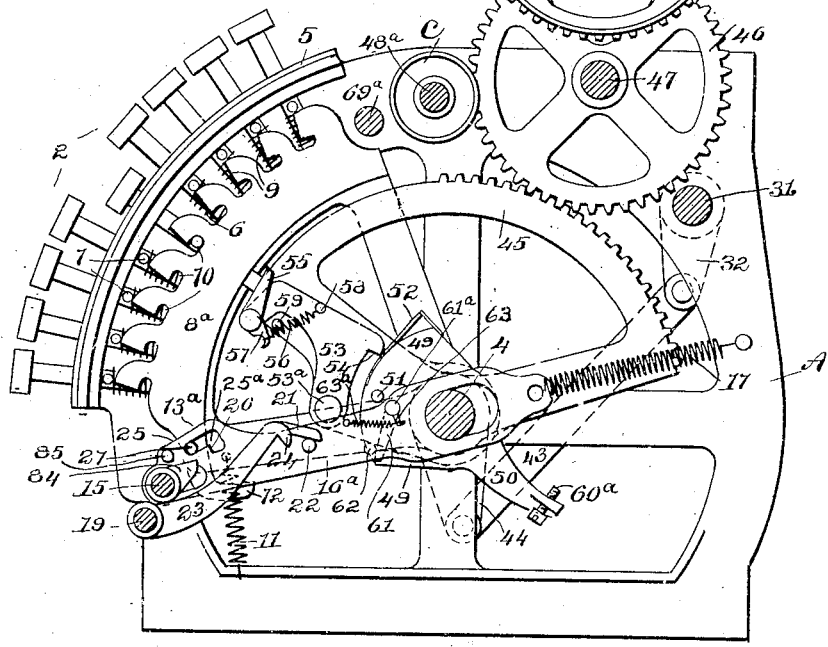
*Fig. 17*
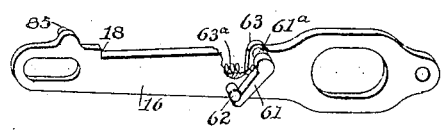
*Fig. 8*
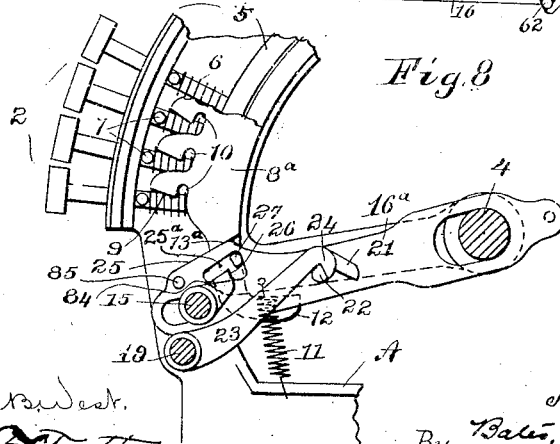
Witnesses
Brennan B. West
Nathan T. Fretter
Inventor,
Henry S. Hallwood,
By Bates, Fouts & Hull
Attorneys.

No. 845,634. PATENTED FEB. 26, 1907.
H. S. HALLWOOD.
CASH REGISTER.
APPLICATION FILED OCT. 22, 1906.

Witnesses

Inventor,
Henry S. Hallwood
By Attorneys

No. 845,634.
PATENTED FEB. 26, 1907.
H. S. HALLWOOD.
CASH REGISTER.
APPLICATION FILED OCT. 22, 1906.
7 SHEETS—SHEET 6.
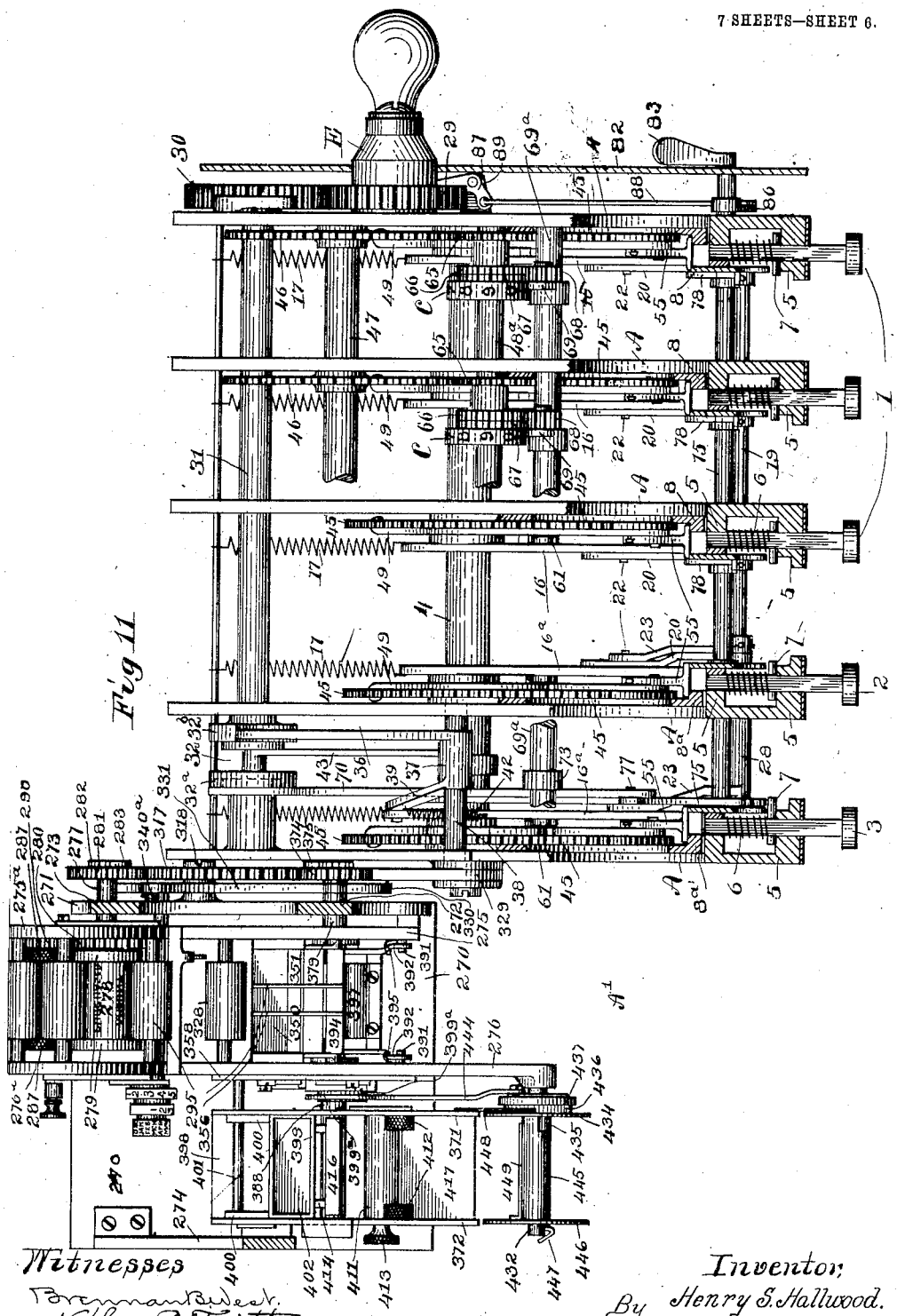
Witnesses
Inventor
Henry S. Hallwood.
By Bates, Fouts & Hull Attorneys.

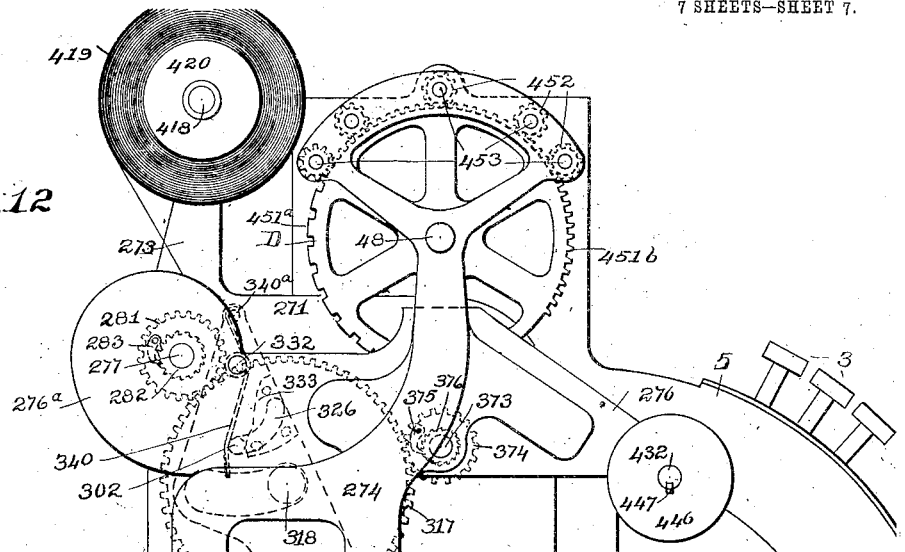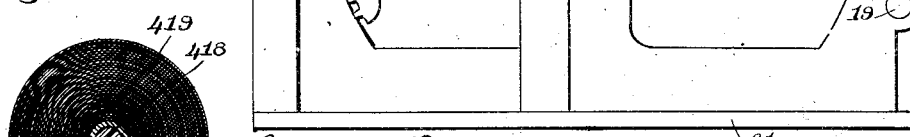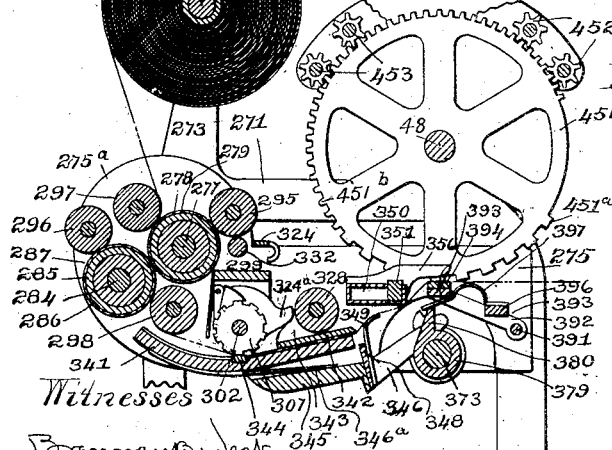

UNITED STATES PATENT OFFICE.

HENRY S. HALLWOOD, OF COLUMBUS, OHIO, ASSIGNOR TO THE INTERNATIONAL REGISTER COMPANY, OF COLUMBUS, OHIO, A CORPORATION OF OHIO.

CASH-REGISTER.

No. 845,634.

Specification of Letters Patent.

Patented Feb. 26, 1907.

Application filed October 22, 1906. Serial No. 340,094.

*To all whom it may concern:*

Be it known that I, HENRY S. HALLWOOD, a citizen of the United States, residing at Columbus, in the county of Franklin and State of Ohio, have invented a certain new and useful Improvement in Cash-Registers, of which the following is a full, clear, and exact description, reference being had to the accompanying drawings.

My improvement is shown and claimed generically in my pending applications, Serial Nos. 711,329, filed April 1, 1899; 735,748, filed November 4, 1899, and 28,740, filed September 1, 1900.

One of the distinctive features of the mechanism described therein consist of interlocking mechanism to compel the operation of the machine in a predetermined consecutive manner in combination with printing mechanism whereby an absolutely correct segregation of the various transactions is secured. The interlocking means between the value, clerk's-initial, and department keys compels a correct sequential use of the keyboard, and consequently a correct registration, indication, and record of each and every transaction.

The present improvement relates particularly, however, to machines of the general and well-known character of that shown and described in Letters Patent of the United States to Hugo Cook, No. 448,937, upon which machine various improvements have been made from time to time, as shown in his Patents Nos. 464,294 and 483,511 and to J. P. Cleal, Nos. 583,889 and 587,298; Thomas Carroll, Nos. 654,226, 703,639, and 765,767; Bickford, Nos. 690,554 and 707,380, and others of the same class, from each of which a very large number of parts are removed and very few substituted therefor, which substituted parts not only accomplish the purpose of the larger number of parts shown in these patents, but at the same time greatly improve the machine by preventing illogical and improper indications, registrations, and records. Heretofore in machines of this class it has been possible for the clerks to make illogical and improper indications, registrations, and records—such as "No sale $5.00," "Reed on account 0.09"—which has been done by entering the machine upon the initial and department keys without first depressing a value-key.

The first object of this invention is to provide interlocking mechanism between the value-keys, clerk's-initial keys, department-keys, and the normally locked main operating member, whereby the latter remains locked until the predetermined sequence of key depression has been carried out, and for this purpose I provide simple means for compelling the performance of distinct operations in predetermined sequence, so as to prevent incorrect use of the machine and compel its correct use, whereby there may be secured a correct indication, registration, and record of each and every operation of the machine. In carrying out this invention the normally locked main operating member (the crank) is under control of the department-keys, which are normally depressible, but unarrestable and ineffectual, until the detent-plate for the same is placed in operative condition by the depression of a clerk's-initial key. The clerk's-initial keys in like manner are normally depressible, but unarrestable and ineffectual until the detent-plate for the same has been released by the depression of a value-key; but the value-keys are normally depressible, and when in depressed position they are arrested and effective. Under this arrangement the main operating member (the crank) is normally locked against operation, while the department-keys and clerk's-initial keys are normally depressible, but are inoperative so far as the accomplishment of any result is concerned.

The second object of my invention is to provide simple means for indicating and recording the nature and value of special transactions—such as goods charged, amounts paid out, and change—which are not to be added upon the registering mechanism. For this purpose means are provided for preventing the operation of the adding mechanism whenever such a transaction is to be made.

The third object of my invention is to provide simple means for releasing arrested keys whenever wrong keys have been depressed, either by mistake or accident. To effect this latter object, means are provided to return all of the keys so depressed to normal position, and to coincidentally prevent any movement of the normally locked operating member, so that an operation of the register and the release of the cash-drawer cannot take place without the sequential operation of the keys, as above referred to.

With the above primary and other incidental objects in view the invention consists of the construction, parts or their equivalents, and their mode of operation hereinafter described, and set forth in the claims.

Figure 10:
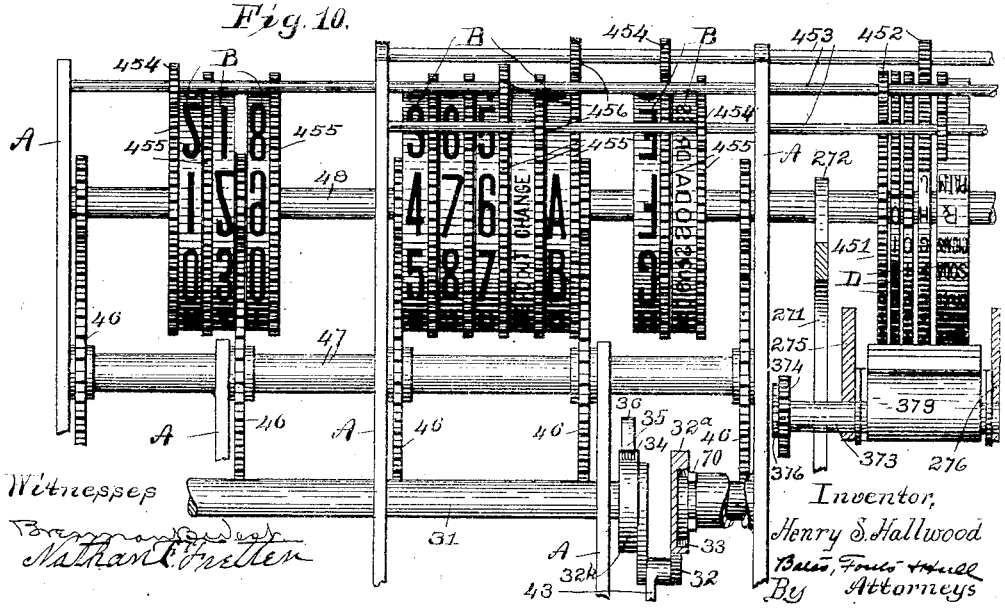

In the drawings, Figure 1 is a front elevation of the assembled machine, the front of the casing being removed. Fig. 2 is an elevation of the right side of the machine. Fig. 3 shows the locking device for the main operating member, coöperating parts being shown in section. Fig. 4 is a vertical sectional view of the machine, showing the cents-bank in left side elevation. Fig. 5 is a perspective view of a detent-plate, part of the same being broken away. Fig. 6 is a perspective view of the key-release device, parts being shown in section. Fig. 7 is a vertical sectional view of the machine, showing the initial-bank in right side elevation. Fig. 8 is a view of a part of the initial bank of keys with the detent-plate and sliding plate therefor in normal position. Fig. 9 is a vertical sectional view of the machine, showing the department-key bank in right side elevation. Fig. 10 is a rear view of the upper part of the machine. Fig. 11 is a plan view of the machine with parts broken away. Fig. 12 is an elevation of a portion of the left side of the machine. Fig. 13 is a sectional view of the printer. Fig. 14 shows a face view of a portion of the tape record. Fig. 15 shows the face view, and Fig. 16 the rear view, of a check. Fig. 17 is a perspective view of the sliding bar, showing the hinged plate thereon; and Fig. 18 is a view showing the preferred order of arrangement of the special or department keys.

Like parts are indicated by similar characters of reference throughout the several views.

Referring by letters and numbers to the drawings, A represents the frame members, which are secured to the base-plate A' and which support the operating parts. B represents the indicators, C the registering-wheels, and D the type-carriers. E is a crank or operating member by which the several parts are actuated, the movements of the various parts being determined by the operation of the value-keys 1, the initial-keys 2, and the department-keys 3 or 3ª, said keys being arranged in vertical rows in front of the machine. As shown, each set or bank of value-keys contains nine keys, representing the nine digits, or they may represent multiples thereof in tens. The first set or bank of keys represents the units of cents; the second, tens of cents; the third, units of dollars; the fourth, the clerk's-initial keys, and the fifth the department-keys and special keys. The keys are mounted radially to the transverse shaft 4 in concentric guides 5 and are yieldingly held out and are returned to their outward position by means of coiled springs 6, which surround them and which are confined between the guides 5 and the transverse pins 7, which pass through the stems of the keys and at right angles thereto.

*Detent-plates.*—Adjacent to and at the rear of the keys are detent-plates 8 and 8ª, said plates being concentric to the shaft 4, upon which they are supported by radial arms, the detent-plates 8 coöperating with the value-keys and the detent-plates 8ª coöperating with the initial and department keys. These detent-plates 8 and 8ª are provided with hooks having beveled faces 9 and recesses 10, said recesses being adapted to receive the transverse pins 7 on the keys, and thereby hold said keys in operated or depressed position, said plates being in turn supported by the pins 7 in a slightly-raised position against the tension of springs 11. The detent-plates 8 and 8ª are also provided with a hook 12, a shoulder 13 or 13ª, and a shoulder 14 near the shaft 4, for purposes to be hereinafter specified.

*Sliding plates.*—Mounted at their rear ends upon the shaft 4 and at their forward ends upon the shaft 15 are sliding plates—16 for the value banks of keys and 16ª for the initial and department banks of keys—there being one of these plates adjacent to each of the said detent-plates 8 and 8ª. Each of the plates 16 and 16ª is provided with elongated slots, through which embrace the shafts 4 and 15 extend, said slots permitting the said plates to be drawn endwise by springs 17, which are attached to the rear end of the plates and to the frame A. The rearward movement of the plates is arrested by the shaft 4, which engages with the forward end of the coöperating slot in the plate 16 or 16ª.

The sliding plates 16 are normally held from rearward movement by the engagement of the shoulder 13 upon the detent-plate 8 near its lower end, with a notch 18 in the upper edge of the plate near the forward end of the latter. (See Figs. 4 and 17.) The plates 16ª are locked in their forward position by means now to be described.

Mounted rigidly upon the transverse oscillating shaft 19, which is located at the lower forward portion of the machine, is a series of levers 20, said levers having cammed projections 21 extending rearwardly therefrom and normally resting upon pins 22, that are attached to the sliding plates 16 for the value-keys. Said cammed levers 20 are adapted to be lifted by said pins when either of the sliding plates 16 is drawn rearwardly by its spring 17, which movement will oscillate the shaft 19. Also rigidly mounted upon the shaft 19, opposite the initial-key bank, is a detent-lever 23, said lever being provided with a detent-hook 24, that engages with the pin 22 on the sliding plate 16ª beneath the clerk's-initial keys, as is shown in Fig. 8. This detent-lever normally prevents rearward movement of said plate 16ª until a value-key has been depressed; but when one of said keys is depressed and the shaft 19 is oscillated the hook-detent 24 is lifted out of engagement with the stud 22 on the said plate 16ª, and so far as this detent is concerned said plate is then free to move rearwardly. The shoulders 13ª of the special detent-plates 8ª of the initial and department key bank rest upon the inclined planes 25 of the special sliding plates 16ª, and said detent-plates are thereby held in such position that the pins 7 will not engage the faces 9 of the detent-plates when the keys are depressed, which construction permits the initial and department keys to be normally depressible, but not arrestable; but by the depression of a value-key the rod 19 is oscillated in the manner hereinbefore described, which disengages the hook-detent 24 from the stud 22 in the plate 16ª of the initial bank of keys, allowing the spring 17 for the said initial bank to draw its sliding plate 16ª rearwardly to a slight extent. Near their forward ends the sliding plates 16ª are provided with L-shaped slots 25ª, into which extend pins or studs 27, that project from the detent-plates 8ª. Simultaneously with the first rearward movement of the sliding plate 16ª of the initial-key bank the detent 8ª for that bank is allowed to drop slightly by sliding on the inclined plane 25 of the initial sliding plate 16ª, which permits the stud 27, attached to the said detent-plate, to settle down and engage with a shoulder 26 in the L-shaped slot 25ª in the sliding plate 16ª, by which means the plate is held in an intermediate position. When an initial-key is depressed with the detent-plate 8ª in this position, the transverse pin 7 in the key bears against the beveled face 9 of the detent-plate and lifts the plate, thereby carrying the stud 27 from the shoulder 26 and permitting the spring 17 to pull the plate 16ª rearwardly to the full extent of its movement in this direction.

It is obvious that if a machine is desired for cash transactions only it is not necessary to carry the sequence of the interlocking mechanism further than the initial-key bank, and I do not wish, therefore, to be limited to claims covering a construction requiring further interlocking mechanism to compel a correct sequential registration. However, persons who do a credit business or who desire to segregate the same on the printed record require another row or bank of keys for securing the full benefits of this method of sequential operation. For this further purpose, therefore, there is mounted loosely on the transverse shaft 19 a sleeve 28, to which is attached a lever 20ª, carrying a cammed face 21ª, similar to the cammed faces 21 under the value banks of keys, said cammed face 21ª normally resting upon the stud 22, attached to the special sliding plate 16ª beneath the initial-key bank 2. Mounted upon the said sleeve 28 is another arm 23ª, similar to the arm 23 under the initial-key bank, said arm 23ª carrying at its upper end a hook-detent 24ª, which normally engages with the stud 22 in the special sliding plate 16ª at the rear of department-keys 3. As the sliding plate 16ª for the initial-key bank is drawn rearwardly the pin 22 thereon, engaging with the cammed face 21ª, rocks the sleeve 28 and lifts the hook-detent 24ª from the pin 22 on the sliding plate 16ª of the department-key bank, thereby permitting the said sliding plate to be drawn rearwardly by its spring 17 until it is arrested by the engagement of the shoulder 26 in the L-shaped slot of said plate with the pin or stud 27 in the detent-plate 8ª for the department-keys. As has been set forth with reference to the initial-key bank, this slight movement of the sliding plate permits the said detent-plate to settle down, so that the department-keys will be arrested when depressed, and when depressed the pin or lug 27 will be lifted out of engagement with the shoulder 26, so that the rearward movement of the sliding plate can be completed. This further movement of the sliding plate for the department bank of keys results in unlocking the main operating device or crank by means now to be described.

*Main operating device.*—The main operating device of the machine consists of the crank-lever E, (shown in Figs. 1, 2, 3, and 11,) that is mounted on a stud that projects from one of the frames A. Upon the hub of the crank is rigidly attached a gear 29, said gear meshing into a second gear 30, that is fast upon the main operating shaft 31, which extends across the machine and makes one complete revolution at each operation of the machine. Near its left-hand end a double-armed crank 32 is rigidly secured to the shaft 31 for operating the rock-shaft 4, hereinbefore referred to. On the outer face of the hub of the left arm 32ª of the crank 32 is a box-cam 33, Figs. 9 and 10, and on the periphery of the opposite hub 32ᵇ is a notch 34. Said notch 34 is adapted to receive a locking-detent 35 on an arm 36 of a bell-crank 37, that is mounted on the shaft or rod 38, which rod extends across one section of the machine and is supported by the frames A. The arm 39 of the bell-crank 37 is provided at its free end with a stud 40, that projects into a slot 41 near the rear end of the sliding plate 16ª for the department-key bank. Normally this sliding plate 16ª is in its forward position, with the detent 35 in the recess 34. The stud 40 will then be at the forward end of the slot 41, in which position it is held by a spring 42, said spring being attached to the plate 16ª and to the arm 39, so that when the sliding plate 16ª for the department-key bank is released and drawn rearwardly by the spring 17 the bell-crank 37 is oscillated. This lifts the detent 35 from the recess 34, after which it rides on the periphery of the disk 32ᵇ during the entire rotation of the shaft 31. However, the sliding plate 16ª is returned to its normal forward position by means hereinafter described before the shaft 31 has completed a full revolution and the stud 40 passing to the rear end of the slot 41, where it remains until the detent 35 is forced into the recess 34 by the contraction of the spring 42, when the stud is drawn to its normal forward position in the slot 41. Fig. 9 shows the parts just described after the sliding plate has been drawn forward and before the crank has completed its rotation.

As thus described the construction is identical, so far as the side frames, rods, gears, and contour-lines of the keyboards, targets, &c., are concerned, with that shown in the patents hereinbefore referred to; but it differs therefrom in respect to the number of operating parts employed and in the increased utility of the machine. From said description it will be understood that the value-keys are normally depressible, but are also releasable after being engaged by their detent-plates, while the initial and department keys are also depressible, but are not engaged by their detent-plates, so that their depression is ineffectual. The depression of a value-key operates through its sliding plate 16 and the lever 20 to lift the detent-hook 24 for the initial-keys, which releases the sliding plate 16ª for the initial-keys and permits it to be drawn rearwardly by its spring 17 until it is arrested by the engagement of the stud 27 on the initial detent-plate 8ª with the shoulder 26 on said sliding plate. The depression of an initial-key then lifts the stud 27 until it is released from the shoulder, which permits the initial sliding plate to be drawn rearwardly its full distance, thereby lifting the lever 20ª and the detent-hook 24ª to release the sliding plate 16ª for the department-keys. This plate is also arrested in an intermediate position by the engagement of its shoulder 26 with the stud 27 on the department detent-plate, after which, when a department-key is depressed, the sliding plate is moved fully to the rear by its spring 17, thereby lifting the detent-hook 35 and unlocking the operating member. It is therefore obvious that the machine shown can be operated only in the following sequence: first, the depression of a value-key; second, the depression of an initial-key; third, the depression of a department-key.

The operation of a clerk's-initial key or a department-key prior to the operation of a value-key is ineffectual and the main operating-lever is positively locked until the above sequence has been carried out.

*Means for operating the main rock-shaft.*—An oscillating movement is transmitted to the shaft 4 from the shaft 31 by means of a link 43, said link connecting the crank 32 with a crank-arm 44, that is rigidly secured to the shaft 4. Loosely mounted on the shaft 4 at the rear of each bank of keys is a gear-sector 45, which sector transmits movement, through an idler-gear 46 on a shaft 47, to the indicators B, that are mounted on a shaft 48, and to the counter-wheels C, that are mounted on a shaft 48ª. Rigidly secured to the shaft 4 at the rear of each bank of keys is a cam-plate 49, said cam-plate having an arm 50, a pin 51, and a spring-catch 52. These cam-plates are adapted to transmit the oscillating movement of the shaft 4 to the sectors 45 by the following-described means: Pivoted at 53ª to the radial forward arm of each of the sectors 45 is a bell-crank 53, said bell-crank having at its heel a shoulder 54 and at its free end a pivoted oscillating pawl 55. The outer end of this pawl is adapted to travel against the inner periphery of the detent 8 or 8ª, being held against the same by a spring 56, that is attached to the short arm 57 of this pawl and to a pin 58 in the bell-crank lever 53. The friction between the bell-crank 53 and the sector carrying the same is sufficient to prevent said arm from swinging loosely by gravity during the operation of the machine. When any sector 45 is at its extreme forward position, the free end of the bell-crank lever 53 on said sector contacts with the corresponding hook 12, that is formed on the lower end of the detent-plates 8 and 8ª, which contact carries the heel of the lever 53 almost into contact with the face of its corresponding cam 49. Thereafter as the cam is oscillated rearwardly the catch 52 will engage the shoulder 54, and thus interlock the cam with the sector 45. This interlocked engagement will continue until the free end of the pawl 55 comes into contact with the end of a depressed key, when the bell-crank lever 53 will be oscillated forwardly until it rests on the pin 59, after which the further movement of the cam forces the catch 52 to disengage from the shoulder, so that the sector 45 remains in the position determined by the depressed key, while the cam continues its movement to its normal position.

As has been explained, when a value-key is depressed the detent-plate 8, coöperating therewith, is lifted until the shoulder 13 thereon is released from the notch 18 in the sliding plate 16, whereupon said plate is moved rearwardly and the detent rests upon the upper edge thereof. This of course holds the hooks 12 of the detent-plates elevated, and it is such elevated hooks that engage the bell-crank 53 and rock them inwardly in the manner above described. If there is no key depressed in a bank, the hook 12 of the corresponding detent will not be elevated, and the bell-crank of the segment corresponding with said detent will not be affected, so that there will be no engagement of said bell-crank with its cam 49. Consequently although the said cam is given its full movement the segment is left in its forward position.

It is obvious from the foregoing description that the targets B will be turned to a position to correspond to the keys last operated and that the counter-wheels will be likewise turned, except under conditions hereinafter set forth.

I will now describe the manner of returning the depressed keys and the sliding plates 16 and 16$^a$ to their normal positions.

The arms 50 on the cams 49 are each provided with set-screws 60 and 60$^a$. The screws 60$^a$ are adapted to engage with the rearward radial arm of the sector 45 and push it forwardly as the cam is swung in that direction. The screws 60 are adapted to bear against the shoulders 14 on the hubs of the detent-plates 8, and as the cams complete their rearward movement said screws will raise the detent-plates slightly, thus releasing the pins 7 of the depressed keys from the recesses 10 in the said plate, so that the keys may be thrust outwardly by their springs 6. The time of contact, however, between said screws 60 and shoulders 14 is such that when the handle E has completed its movement the cams 49 are moved slightly forward, thus allowing the shoulder 14 on the hubs of the detent-plates to be relieved of the pressure of the screws 60, so that the springs 11 may draw the detent-plates downwardly into the notches 18 of the sliding plates 16 when they are carried forward. Extending laterally from each of the plates 16 and 16$^a$ is a hinged plate 61 and a stud 62, against which said plate is adapted to engage. The hinged plates 61 are each pivoted on a pintle 61$^a$, that passes through the plates 16 or 16$^a$, said pintle on its outer end carrying a short arm 63, to which and to a pin in the plate 16 or 16$^a$ are attached a spring 63$^a$, said spring being adapted to hold the free end of the hinged plate 61 normally against the stud 62. Extending laterally from each of the cams 49 is a stud 51, which in its forward movement is adapted to pass freely to the rear of the corresponding hinged plate 61, providing the sliding plate to which the hinged plate is connected is in its forward position. If, however, the sliding plates 16 and 16$^a$ are released, so that they are in their rearward position, the pins 51 pass between the hinged plates 61 and the studs 62, said operation being permitted by the oscillation of said hinged plates about their pivots. When the cams 49 have completed their forward movement and the pins 51 have passed below the hinged plates 61, said plates resume their normal positions by the contraction of the springs 63$^a$. As the cams then return rearwardly the pins 51, pushing on the rear faces of the hinged plates 61, cause the plates 16 and 16$^a$ to slide forwardly to their normal position, the pins 51 passing to a position above the hinge-plates 61, as indicated in Fig. 4. When the plates 16 have thus been moved forwardly into their normal positions, the shoulders 13 of the detent-plates 8 are drawn by the springs 11 into the notches 18 in the sliding-plates. When the sliding plates 16$^a$ are moved forwardly to their normal positions, the detent-plates 8$^a$ are raised by the beveled faces 25 sliding under the shoulders 13, thus allowing the pins 7 of the depressed initial and department keys to be released from the recesses 10.

*Cut out for the register.*—When cash has been received, the amount is not only indicated on the targets or indicators 47, but it is also added to previous amounts received on the counter-wheels C. These counter-wheels, which are mounted on the shaft 48$^a$, are operated by means of gears 65, 66, and 67 on the said shaft 48$^a$ and by the interlocking gears 68, all of which gears are driven by the sectors 45 of the value-keys, as described above and in the patents referred to. The interlocking gears 68 are carried on rock-arm 69, which arms are rigidly mounted on the rock-shaft 69$^a$. These gears are normally out of engagement with the gears 66 and 67; but they are thrown into engagement therewith when the shaft 69$^a$ is rocked, which motion is secured by a link 70, which link has near its front end a notch 71, into which normally projects a pin 72 on a rocker-arm 73, said rocker-arm being rigid on shaft 69$^a$. The rear end of the link, which is forked to receive the shaft 31, has a laterally-extending pin 74, that is adapted to travel in the box-cam groove 33 on the hub 32$^a$, so that a revolution of the shaft 31 imparts a reciprocatory movement to the link 70 and an oscillatory movement to the rocker-shaft 69$^a$. The manner of operation thus far is similar to that shown in the patents referred to. When, however, it is desired to operate special keys representing transactions in which no cash is received—such as "Change," "Paid out," and "Charge"—the forward end of the link 70 is raised so that the pin 72 is out of engagement with the notch 71, which thus maintains the counter-wheels C out of operation when such keys are operated. The following means are employed for accomplishing this result: Journaled upon the shaft 4, (see Fig. 9,) adjacent to the detent-plate 8$^a$ of the department-key bank, is an oscillating plate 75, said plate having inclined slots 76, that are adapted to be engaged by the cross-pins 7 in the special keys 3$^s$, so that the plate 75 is raised and lowered by the cross-pins 7 as the said special keys are moved in and out. The plate 75 has an upwardly-extending arm that carries a stud 77, said stud being situated directly under and in contact with the forward end of the link 70 and being adapted upon the depression of one of the special keys 3ˢ to raise the forward end of the link 70 out of engagement with the pin 72 and to support said link in that position until the pin 7 is released from the detent 8ª. While held in this position the link 70 may reciprocate in the manner described without oscillating the shaft 69ª, the interlocking gears 68 being maintained out of engagement with the gears 66 and 67. The counter-wheels are therefore cut out of operation when any one of the special keys 3ˢ is depressed.

*Special key release.*—Mounted upon the side of each of the detent-plates 8 is a bell-crank lever 78, the lower end of said lever coinciding with the shoulder 13 on said plate. The arm 79 of the bell-crank lever is held against a pin 80 on the detent-plate by a spring 81, said pin preventing the lever from swinging forwardly. Outside the casing 82 is a hand-lever 83, by means of which an oscillating movement may be given to the shaft 15, said hand-lever being secured to said shaft. Mounted upon the shaft 15 at the side of the plates 16 are cams 84, said cams being adapted upon the oscillation of the shaft 15 by the lever 83 to engage with the lower ends of the bell-crank levers 78 and to raise the detent-plates 8 sufficiently to allow the cross-pins 7 of the depressed keys to be released from the recesses 10 of the detent-plates 8. The sliding plates 16 are moved forwardly by the cams 84 bearing against the pins 85 on said slides, this movement allowing the detent-plates 8 to be pulled into the notches 18 by the retractions of the coiled springs 11, said springs being attached to the lower ends of the detent-plates 8 and to the frame A. When the sliding plates 16 have been moved to their extreme forward position, the shaft 15 is returned backward to normal position, during which movement the cams 84, bearing against the bell-cranks 78, move them rearwardly, thereby tensioning the springs 81 so that when the cams 84 pass the lower ends of the bell-cranks 78 the recoil of the springs 81 will return the bell-cranks 78 to their normal positions.

To prevent operating the crank E while the keys are being returned to normal position by means of the hand-lever 83, a locking means is provided, as shown in Figs. 2 and 3, as follows: Attached to the shaft 15 inside the casing 82 is a crank-lever 86, which lever is connected by a link 88 to the short arm of a bell-crank 87, said bell-crank being pivoted on a bracket 89 on the frame A. The free end of the long arm of the lever 87 lies between pins 90, that project from a bar 91. This bar 91 is supported in bearings in the frame A and the casing 82, and when moved endwise by the oscillation of lever 87 it is engaged and disengaged from a recess or hole 92 in the handle 93 of the crank E. Normally the bar is out of engagement with the crank-handle; but when the lever 83 is turned to unlock the depressed keys the bell-crank will be rocked, which will slide the bar 91 outwardly into locking engagement with the crank-handle. The crank E is prevented from being turned backwardly in any part of its operation by the pawl 94, that is pivoted on the frame A and is engaged with the teeth of one of the gears 29 or 30.

*Check and tape printer.*—The check and tape printer shown herein is in many respects the same as that shown and fully described in my preceding application, Serial No. 59,413, so that the following brief description is deemed sufficient for this application: Mounted on the base-plate A' of the register, adjacent to one end of the machine, is the base-plate 270 of a check and tape printer frame. 271 represents the inner vertical standard of said frame, which standard is provided in its forward and rear portions with upwardly-extending arms 272 and 273, respectively. The outer frame-standard, which is shown at 274, is extended upwardly opposite the inner frame-standard arm 272. The check-printer frame consists, primarily, of an inner frame-plate 275 and an outer frame-plate 276, said frame-plates being parallel and terminating at their rear portions in disk-like heads or enlargements 275ª and 276ª. Journaled in the head portions of the frame-plates 275 and 276 is a transverse shaft 277. Between said frame-plate heads the shaft 277 carries a printing and feeding roll 278, said roll having formed on its periphery suitable type projections which may indicate suitable words, such as "Amount purchased," "Please pay cashier," &c. (See Fig. 15.) At the ends of the type-covered portion of the periphery of the roll 278 are feeding-flanges 279, and on the outer side of the inner flange 279 I mount on said shaft 277 a gear-wheel 280. The shaft 277 is provided with an extension on the outer side of the frame-plate 275, on the extremity of which is loosely mounted a pinion-wheel 281. Fixed on the extension of the shaft 277, beyond the wheel 281, is a ratchet-wheel 282, (shown in dotted lines in Fig. 12,) with which a spring-actuated pawl 283 is adapted to engage, one end of which pawl is eccentrically connected with the inner face of the pinion 281. Mounted on a shaft 284, which extends between the heads of the check-printer side frames, in the rear of and below the shaft 277, is a printing and feed roll 285, said roll carrying, as indicated more clearly in Fig. 13 of the drawings, a printing-collar 286, the latter preferably having type projections on its periphery. These type projections, which are indicated in Fig. 13, are adapted to print the name and address of a person or firm. (See Fig. 16.) At the sides of the printing-collar 286 the roll 285 is provided with knurled flanges 287. (See Fig. 11.) The shaft 284 is driven by a gear-wheel 290, which wheel is secured to said shaft and meshes with the wheel 280, that is secured to the shaft 277. Journaled in front of and above the center of the roll 278 is an inking-roll 295, said inking-roll being formed of suitable absorbent material and having its periphery in frictional contact with the faces of the type on the roll 278. 296 also represents an inking-roll, which roll is journaled above and in rear of the printing-roll 285 and the periphery of which is in contact with the faces of the type on said printing-roll. Journaled in the rear of the roll 278 is a platen-roll 297, which roll is adapted to press a strip of paper into contact with the type on the roll 278. 298 represents a journaled platen-roll which performs a similar office for the printing-roll 285. 299 represents a swinging yoke, which is located between the side frame-plates of the check-printer at a point below and in front of the roll 278. Through the parallel arms of the yoke 299 passes a transverse shaft 302, on which shaft are mounted printing-wheels 307, one of which appears in Fig. 13, said wheels having type-figures projecting from their peripheries, the type-figures on each wheel running from "0" to "9." Connecting the upper sides of the check-printer side plates is a bar 324. The dating-wheel shaft 302 projects at its outer end into an upwardly and forwardly curved slotted opening 326 in the side frame-plate 276, (see Fig. 12,) and the inner end of the shaft passes through similar slotted openings (not shown) in the plates 271 and 275. In front of the numbering and dating wheel above described I journal an inking-roll 328.

As indicated in Fig. 12 of the drawings, I secure to the rock-shaft 4 a sector 329, by which the movement of the rock-shaft 4 is transmitted to the pinion 281, said pinion being driven by an idler 317, that is journaled on a stud 318, projecting from the side frame 271. I also secure to the inner side of the arm of the sector 329 a shorter sector 330, the teeth of which mesh with those on the periphery of a sector 331, which latter sector is carried on one end of a transverse shaft 332, which shaft is journaled in the check-printer frame above the numbering and dating mechanism.

Mounted on the shaft 332 is a spring 340, the upper end of which engages the forward side of a projecting pin 340ª on the sector 331, while the downwardly-extending free end portion of said spring bears against the rearward side of the shaft 302 and retains the latter in contact with the curved upper side of the forwardly-projecting foot portion of a plate 333 on said sector.

Below the numbering and dating mechanism hereinbefore described I provide a paper-guide 341, this guide-plate being slightly bowed or curved, as shown, and having its forward portion provided with an upper side shearing-plate 342, between which and the body of the plate 341 is formed a paper-passage. As indicated, the shearing-plate 342 has rising from one side and adjacent to the inner end thereof a lug 343. The guide-plate 341 is provided centrally on its upper side with a transverse platen-bar 344, which extends beneath the numbering and dating printing-wheels. 345 represents a cutting-frame, the rear bifurcated end of which is pivoted to opposite sides of the guide-frame 341, while its forwardly-extending portion terminates in arms 346, but one of said arms being shown in Fig. 13. 346ª indicates a spring-strip, one end of which is secured to the rear and under side of the guide-body 341 and the forward and free portion of which exerts a downward pressure upon the rear portion of the cutter-frame 345. As is shown in Fig. 13 of the drawings, I secure to the vertical forward end of the body of the cutting-frame 345 and between the inner ends of the arms 346 an upwardly-projecting knife or cutting-blade 348, the upper edge of which is beveled or sharpened, as shown. Secured to the outer face of this knife-blade is an upwardly-projecting guide strip or plate 349, the upper portion of the latter being inclined or curved forwardly, as shown. 350 represents an inking device, which is in the form of an oblong box, as shown in Figs. 11 and 13 of the drawings, which device extends in front of the inking-roll 328. This inking device or casing in addition to containing ink is provided in its forward portion with a transverse inking-pad 351, of suitable absorbent material, the upper side of which projects through a slotted opening in the upper side of said casing. Extending transversely across the inking-case 350 at suitable separated points are inking-pad-dividing blades 356, these blades projecting forwardly and upwardly, as indicated in Fig. 13.

From the outer side of the check-printer frame-plate 276 I support a tape-printer frame comprising inner and outer parallel side plates 371 and 372, these side plates being united in the manner hereinafter shown.

373 is a cam-shaft which extends transversely through and is journaled in the forward portion of both the check and tape printing frames. On the inner end of the shaft 373 I mount loosely a pinion-wheel 374, and on the face of said pinion is pivoted eccentrically a spring-actuated pawl 375, that is adapted to drop into engagement with a ratchet-wheel 376, as is shown in Figs.

10 and 12. Mounted rigidly on said shaft 373 is a cam-sleeve 379, the latter being provided with a tangential projection 380. On the inner side of the tape-printer frame the shaft 373 carries a cam-sleeve 388, which corresponds in form with the cam-sleeve 379 and which, as prescribed for the latter, is provided with a tangential arm or projection 380. (Not shown.) Pivoted on pins 391, which project inwardly from the forward portion of the check-printer side plates 275 and 276, are the forward ends of parallel arms 392 of a platen-yoke 393, the transverse rear bar of this yoke having mounted thereon a suitable platen-pad 394. This platen-yoke frame is normally pressed downward by spring 395, as shown in Fig. 11. Connecting the yoke-arms 392 is a transverse bar 396, the latter having secured thereon the front portion of a spring-plate 397, the inwardly or rearwardly extending portion of which projects beneath the platen-head or tranvserse portion 393, said spring being also adapted to contact with the outer end of the cam projection 380 of the cam-sleeve 379. In the rear end portion of the tape-printer frame and between the plates 371 and 372 may be journaled a guide-roller 398, (see Fig. 11,) and in front of this roller is supported an inking case and pad 399. Through the rearwardly-extending arms 400 of this inking device extends a transverse shaft 401, which projects from the plate 358. The body of this inking device is similar in construction to the inking device 350, being provided with an upwardly-projecting inking-pad 402. Mounted on a shaft through the tape-printer side plates is a feed-roller, of rubber or similar material, 411. (See Fig. 11.) Above the end portions of this roller are journaled feed-idlers 412, the peripheries of which are in frictional contact with the periphery of the roller 411. On the outer side of the outer frame-plate 372 the shaft for the roller 411 is provided with a thumb-nut or finger-piece 413. Pivoted to the inner sides of the frame-plates 371 and 372 are the forwardly-extending parallel arms 414 of a swinging platen-frame, on which is mounted a suitable platen-pad 416. In front of the feed-roll 411 I provide between the tape-printer side plates a forwardly-extending downwardly-inclined plate 417. Extending outward from the rear standard 273 of the inner frame-plate of the check-printer is a fixed rod 418. On the outer end of this rod or shaft 418 is loosely mounted a roll of paper 419. 432 represents a transverse shaft which has its inner end portion secured to and projecting outwardly from a forward extension of the check-printer side plate 276. Upon the shaft 432 in its inner portion is loosely mounted a disk 434, the latter being formed with a half-tubular central projection 435. This disk has formed on its outer side a lateral extension in the form of a ratchet-wheel 436, and with the outer side of said ratchet-wheel 436 is formed a friction-disk 437. 444 represents a driving-arm, the inner ring-shaped end of which loosely embraces the eccentric 399ª and the outer end of which is pivoted to the upper end of an arm (not shown) on shaft 432. Loosely mounted on the reel-shaft 432 is a reel-tube 445, the recessed inner end of which engages the half-tubular projection 435 of the flange 434. This tubular body 445 carries an outer end flange 446. The shaft 432 is provided with an outwardly-extending spring 447, the shoulder termination of which is adapted to prevent the tube 445 from slipping off the shaft 432. 448 represents a pivoted pawl, the outer end of which engages the teeth of the ratchet 436 and prevents reverse rotation of the latter. Secured to the outer reel-flange 446 and extending from the inner side thereof adjacent to and parallel with the tubular body 445 is a paper-binding strip 449.

Rigidly secured in the upper ends of standards 272 and 273 is the outer end or extension of shaft 48, on which is mounted between the standards 272 and 273 toothed and type-carrying disks D in two groups, one over the tape-printer and the other group (shown at 451) over the check-printer.

Of each section the three disks on the right have formed on a portion 451ª of their peripheries type-numerals running from "0" to "9," which represent values in cents, dimes, and dollars. The next disk is similarly formed, and the type represent the clerk's initials. The last disk to the left has a broader face, and the type represent the department in which the transaction was made and as indicated on the department-keys. On the remaining arcs of the disks D are teeth 451ᵇ, adapted to mesh with pinions 452 on shafts 453. Said shafts 453 are journaled in the standards 272 and 273 and in the frames A and carry pinions 454, which mesh with the toothed flange 455 on the targets B that give a front indication, and also pinions 456, that mesh with the toothed flanges 455 of targets B, that give a rear indication. The diametrical ratio between the pinions 452 and 454 and 456 is such that when a target 47 makes a complete revolution the corresponding disks of the printer will only make approximately one-fourth of a revolution.

The construction of the printer is such that when the shaft 4 is oscillated in the operation of the machine the sector 329 will transmit its motion to the pinions 281 and 374 on the shafts 277 and 373, respectively, through the idler 317, whereby the various feeding and printing rolls are caused to operate, the feeding-rolls drawing the paper strips from the rolls 419, said strips being conducted between the various platens and type-faces, whereby both strips are printed and the checks are cut off. The oscillation of the shaft 4 also rocks the sector 331, which moves the plate 333 thereon away from the shaft 302, thereby permitting the spring 340 to rock the frame 299, carrying the numbering-wheels 307 upwardly. As said frame approaches the upward limit of its movement a nose 324ᵃ, that is formed on a plate that is journaed on the shaft 302, engages with the bar 324, which turns said plate on said shaft. This plate carries transfer-pawls, and the movement thus imparted thereto carries the pawls back into position for effecting a transfer. As the plate is forced back to normal position by the sector the nose 324ᵃ engages the lug 343, which rocks said plate back to its normal position on the shaft 302, thereby effecting the transfer.

Further details and specifications concerning the printing mechanism may be found in my pending application, Serial No. 59,413, hereinbefore referred to.

Operation: The operation of the machine is as follows: Normally the main operating-lever E projects downwardly at the end of its travel and the sectors 45 and indicators B will be in the positions determined by the registration made in the next previous operation. The slides 16 and 16ᵃ will be in their forward position, those (16) under the value-keys being held therein by the detent-plates 8 and those (16ᵃ) under the initial and department keys being held in position by detent-hooks 24. The keys will be released and in their operative positions. If now, for instance, a registration is desired to be made of $3.23 by clerk E in the drug department, he presses the corresponding value-keys 1, and thereby raises the detent-plates 8, releasing the sliding plates 16, which are drawn rearwardly by springs 17. As the sliding plates 16 pass rearwardly the pins 22 bear against the projections 21 on the levers 20, oscillate the shaft 19, to which said levers are secured, and thus raise the detent-lever 23 under the initial bank. This lever being also secured to the shaft 19, the detent is lifted out of engagement with the pin 22 on the sliding plate 16ᵃ of the initial-key bank, which allows the said sliding plate to be drawn rearwardly by its spring 17 until it is arrested by the shoulder 26, which contacts with the stud 27 on the detent-plate 8ᵃ. Before being so released the sliding plate 16ᵃ held the detent-plate 8ᵃ at such a height on the inclined face 25 that the pins 7 on the initial keys could not be engaged when depressed by the detents on the detent-plate 8ᵃ; but as the sliding plate 16ᵃ is released from the detent-hook and is moved rearwardly into engagement with the stud 27 the detent-plate 8ᵃ drops slightly, so that as the initial key (E in this instance) is depressed the pin 7 thereon contacts with the inclined face 9 of the detent-plate 8ᵃ and lifts said plate sufficiently to raise the pin 27 above the shoulder 26, which allows the sliding plate to complete its rearward movement. By this movement the cam-lever 20ᵃ on one end of the sleeve 28 is raised, thereby oscillating the sleeve 28 and raising the detent-hook 24ᵃ from engagement with the pin 22 in the slide-plate 16ᵃ under the department-bank, after which a department-key (drugs in this instance) may be depressed and be arrested by its detent-plate. When the sliding plate 16ᵃ under the department-bank is released and is moved rearwardly, it carries with it the end of the lever 39 of the bell-crank 37, thus lifting the detent 35 on the lever 36 out of the notch 34 of the disk 32ᵇ on the shaft 31. The main operating-shaft is thereby unlocked, so that it may be turned by the crank E. During the first half-revolution of the shaft 31 the crank-lever 44 on the rock shaft 4 is raised, and the shaft 4, with the cam-plates 49, will be oscillated, whereby the screws 60ᵃ at the outer ends of the cam-plate arms 50 will contact with the rear arms of the sectors 45 and will return said sectors to an extreme forward position, the pawls 55 on said sectors contacting with the hooks 12 on the detent-plates just before the sectors 45 come to the end of their travel, thus throwing the shoulders 54 toward the cam-plates 49, so that they are engaged by the spring-catches 52. As the sectors 45 move forward the indicators B, with which they are geared, and also the type-carrying disks D are turned to zero, while the gears 65, 66, and 67 for the counter-wheels C are not affected, as they are not at that time interlocked with the pinions 68. In making this forward movement should the pawl 55 on the bell-crank 53 contact with a key that has been depressed, as is shown in Fig. 7, the bell-crank will simply oscillate on its pivot 53ᵃ and pass said key without resistance. Also during the forward oscillation of the shaft 4 the pins 51 on the cam-plates 49 pass below the inclined hinged plates 61 on the sliding plates 16 and 16ᵃ. During the return oscillating movement of the shaft 4 the spring-catches 52 on the face of the cam-plates 49 engage with the shoulders 54 of the bell-cranks 53, thus locking the cam-plates 49 to the sectors 45, upon which the bell-cranks 53 are pivoted. This carries the said sectors 45 rearwardly until the end of the pawl 55 contacts with the inner end of a depressed key, when the bell-crank lever 53, to which it is pivoted, is swung downward against the pin 59 and the shoulder 54 is released from the catch 52, whereby the cam-plate 49 is disengaged from the sector 45 and is free to complete its rearward oscillation. The oscillation of a sector 45 to the point where it is arrested by a depressed key causes the indicator B, with which it is geared, to be turned sufficiently to show the value of the key operated. It also oscillates the corresponding type-carrier to a position for printing the proper amount and adds the same on the corresponding counter-wheel C, as will be more fully described. Just previous to the complete oscillation of the cam-plate 49, however, the set-screws 60 contact with the shoulders 14 of the detent-plates 8, lifting said plates slightly, so that the pins 7 are released from the recesses 10, thus allowing the depressed keys to be thrust outwardly by their springs 6. When the shaft 31 has completed a revolution, however, the crank-arm 32 has been carried a short distance past the center and has turned the cam-plates 45 forward, thus relieving the detent-plates 8 of the pressure of the screws 60, which allows said plates to be drawn downwardly by the springs 11. However, said plates would still be held upward by the sliding plates 16, upon which the shoulders 13 rest, if it were not for the fact that the said sliding plates are moved forward to their normal position during the rearward oscillation of the cam-plates 45, said movement being caused by the pins 51, which bear against the rear sides of the hinged plates 61. When in their extreme forward position, the shoulders 13 of the detent-plates 8 are engaged by the shoulders 18 on the sliding plates 16, which prevent the rearward movement of said plates until the detent-plates are again lifted by the depression of keys coöperating therewith. The sliding plates 16ª are moved forward in a manner similar to that just described for the plates 16, and when so moved the inclined faces 25 are driven under the shoulders 13 of the detent-plates 8ª, thereby raising and holding said detent-plates in a position above the travel of the pins 7 on the initial and department keys for the purpose previously described. The oscillation of the shaft 4 also operates the tape and check printer as has been already described.

As before referred to, the oscillation of a sector under a value-bank to the point where it is arrested by a depressed key turns its corresponding counter-wheel C to add the value of the depressed key to the amount already shown on the counting-wheels. This and the manner of throwing the idlers 68 into mesh with the gears 66 and 67 has been fully described herein and is also set forth in certain of the patents referred to. When the crank E and shaft 31 have each made a full rotation, the recess 34 is in position to receive the detent 35, which is then forced into said recess by the contraction of the spring 42, so that the shaft 31 and the crank are locked against further manipulation until keys representing another transaction have been depressed.

The above description refers entirely to the operation of the register when cash is received. I will now describe how the machine operates when "charge," or "paid out," or "change" transactions are made, the object being to indicate the character of the transaction on the indicators 47 and to print the same on the tape and check, but to maintain the counter-wheels out of operation. For this purpose pins 7 on the special-department keys 3ª are made of sufficient length for engaging the beveled faces of the cut-out plate 75, which when the key is depressed is swung upwardly to lift the free end of the link 70, so that as said link reciprocates the notch 71 will be out of engagement with the pin on the rock-arm 73, thereby allowing the machine to be operated without moving the idler-pinions 68 into engagement with the gears 66 and 67 for the counter-wheels.

It will be observed that in the foregoing specification and in the drawings the sequence of the operation provides for the following predetermined order of key depression: first, the depression of a value-key; second, the depression of an initial-key, and, third, the depression of a department-key.

I do not wish to be confined to this particular order, however, as it is obvious that where desired the depression of the department-keys may precede the depression of the clerk's-initial keys, in which case the department-key would be operated before the clerk's-initial key can be effectively depressed.

Having described my invention, I claim—

1. In a keyboard mechanism for the purpose described, a group of normally depressible and arrestable keys, a group of normally depressible but unarrestable keys, and means under control of the keys of the first group for rendering the keys of the other group arrestable when depressed.

2. In a keyboard mechanism for the purpose described, normally depressible and arrestable value-keys representing different denominations, normally depressible but unarrestable initial-keys, and means under control of the value-keys for rendering the initial-keys arrestable when a value-key is depressed.

3. A keyboard mechanism for the purpose described, comprising normally arrestable value-keys normally depressible but unarrestable initial-keys, normally depressible but unarrestable department-keys, and means under control of the value-keys and of the initial-keys for rendering the department-keys arrestable when a value-key and an initial-key are depressed.

4. A keyboard mechanism for the purpose described comprising normally arrestable groups of value-keys representing different denominations, normally depressible but unarrestable initial-keys, normally depressible but unarrestable department-keys, and means requiring the depression of a value-key and of an initial-key before a department-key can be arrested when depressed.

5. A keyboard mechanism for the purpose described, comprising keys arranged in groups of different classes, the keys of certain of said classes being normally depressible but unarrestable and devices controlled by the operation of the keys in one class for rendering the keys of the adjacent class arrestable when operated.

6. A keyboard mechanism for the purposes described, comprising keys arranged in groups of different classes, the keys of certain of said classes being normally depressible but unarrestable devices controlled by the operation of the keys in one class for rendering the keys of the adjacent class arrestable when operated, and means controlled by the keys in the last-named class for rendering the keys of the next adjacent class arrestable when operated.

7. The combination of a plurality of groups of keys, the keys of certain of said groups being normally depressible but unarrestable a slide for each of said groups, said slide being controlled by any key in its group, and means whereby the slide for one group renders the keys of the next adjacent group arrestable when depressed.

8. The combination of different groups of keys, the keys of certain of said groups being normally depressible but unarrestable a slide for each of said groups, said slide being controlled by any key in its group, a detent for each group, and means whereby the slide for one group controls the detent of another group.

9. The combination of different groups of keys, the keys in certain of said groups being normally unarrestable when depressed, a slide for each group of keys, said slide being controlled by any key in its group, and means whereby the slide for one group renders arrestable the keys in another group.

10. The combination of a plurality of groups of keys, the keys in certain of said groups being normally unarrestable when depressed, a slide for each group of keys, said slide being controlled by any key in its group and means whereby the slide for one group renders arrestable the keys of its adjacent group.

11. In a cash-register, the combination of a plurality of groups of keys, said keys being divided into classes representing values, initials and departments, the keys of the different classes being effectively depressible in a predetermined sequence only, and means controlled by the keys of each class for preventing the operation of the register until one of the keys in each class has been depressed.

12. In a cash-register, the combination of a plurality of groups of keys, said keys being divided into classes representing values, initials and departments, a sliding plate for each group, and means controlled by the said sliding plates for preventing the operation of the register until the sliding plate for each class has been moved.

13. The combination of a group of keys, a slide for said group, said slide having an inclined portion, a detent for said group, said detent resting on the inclined portion of the slide and being held thereby out of locking relation with the keys, and means for moving the slide to bring the detent into locking relation with the keys.

14. In a cash-register, a group of keys, a sliding plate for said group, a detent-plate for said group, and means whereby each of said plates controls the operation of the other plate.

15. In a keyboard mechanism for the purpose described, a plurality of groups of keys, certain of said groups being normally depressible but unarrestable, devices controlled by the keys of one group for rendering the keys of the second group arrestable when depressed, and devices controlled by the keys of said second group for rendering the keys of a third group arrestable when depressed.

16. In a keyboard mechanism for the purpose described, a group of depressible keys, a plurality of groups of unarrestable keys, means controlled by the keys of the depressible group for rendering arrestable the keys of all the remaining groups except one, and means controlled by the keys thus rendered arrestable for rendering arrestable the keys of the remaining group.

17. In a cash-register, the combination with a normally locked main operating member, of a series of value-setting elements, a series of initial-setting elements and a series of department-setting elements, locking means for the department-setting elements, said locking means compelling the depression of a value-setting element and an initial-setting element before the department-setting element can be locked in operated position, and means controlled by the department-setting elements for unlocking the main operating member.

18. In a cash-register, the combination with a normally locked main operating-shaft, of a series of value-keys, a series of initial-keys, and a series of department-keys, locking means controlling the department-keys and requiring the depression of a value-key and an initial-key before the department-key can be operated and means controlled by the department-keys for unlocking the main operating-shaft.

19. In a cash-register, the combination with a normally locked main operating-shaft, of a series of value-keys, a series of initial-keys, and a series of department-keys, locking means controlling the department-keys and requiring the depression of a value-key and an initial-key before the department-key can be operated, means controlled by the department-keys for unlocking the main operating-shaft, and a recording device that is adapted to produce a record showing what keys have been operated.

20. In a cash-register, the combination with a normally locked main operating member, of a series of value-keys, a series of initial-keys and a series of normally depressible but unarrestable department-keys, means controlled by the said department-keys for unlocking the main operating member, said means being normally out of operative relation with the department-keys and means requiring the depression of a value and of an initial key for placing said unlocking means into operative relation with the department-keys.

21. In a cash-register, the combination with a normally locked main operating-shaft, of a series of value-keys, a series of initial-keys and a series of normally depressible but unarrestable department-keys, means controlled by the said department-keys for unlocking the main operating-shaft, said means being normally out of operative relation with the department-keys and means requiring the depression of a value and of an initial key for placing said unlocking means into operative relation with the department-keys.

22. In a cash-register, the combination with a normally locked main operating member, of a series of value-keys, a series of initial-keys and a series of normally depressible but unarrestable department-keys, means controlled by the said department-keys for unlocking the main operating member, said means being normally out of operative relation with the department-keys, means requiring the depression of a value and of an initial key for placing said unlocking means into operative relation with the department-keys, and a recording device that is adapted to produce a record showing what keys have been operated.

23. In a cash-register, the combination with a normally locked main operating member, of series of value-keys, a series of initial-keys and a series of normally depressible but unarrestable department-keys, means under control of the department-keys for locking the main operating member, said means being out of operative relation with the department-keys while they are unarrestable and means controlled by the value and initial keys for rendering the department-keys arrestable whereby they may unlock the main operating member.

24. In a cash-register, the combination with a normally locked main operating-shaft, of series of value-keys, a series of initial-keys and a series of normally depressible but unarrestable department-keys, means under control of the department-keys for locking the main operating-shaft, said means being out of operative relation with the department-keys while they are unarrestable and means controlled by the value and initial keys for rendering the department-keys arrestable whereby they may unlock the main operating-shaft.

25. In a cash-register, the combination with a normally locked main operating member, of series of value-keys, a series of initial-keys and a series of normally depressible but unarrestable department-keys, means under control of the department-keys for locking the main operating member, said means being out of operative relation with the department-keys while they are unarrestable, means controlled by the value and initial keys for rendering the department-keys arrestable whereby they may unlock the main operating member, and a recording device that is adapted to produce a record showing what keys have been operated.

26. In a cash-register, a series of value-setting elements and a series of initial-setting elements, means for arresting the said elements in their operated positions, the arresting means for the initial-setting elements being normally out of arresting position and means under control of the value-setting elements for permitting said arresting means for the initial-setting elements to move to its arresting position.

27. In a cash-register, a series of value-keys and a series of initial-keys, detents for arresting the said keys in their operated positions, means for normally holding the detent for the initial-keys out of arresting position and devices under control of the value-keys for permitting said means to be moved, whereby the detent for the initial-keys may come into arresting position.

28. In a cash-register, a series of value-keys and a series of initial-keys, detents for arresting the said keys in their operated positions, a spring-impelled sliding plate holding the detent for the initial-keys normally out of arresting position, and devices under control of the value-keys for releasing said sliding plate so that it may be moved, whereby the detent for the initial-keys may come into arresting position.

29. In a cash-register, the combination with a series of value-keys, a series of initial-keys and a series of department-keys, arresting means for said department-keys, said means being normally out of operative relation with the department-keys and means requiring the operation of both a value and an initial key for placing said arresting means in operative relation with the said department-keys.

30. In a cash-register, the combination with a normally locked main operating member, a series of value-keys, a series of initial-keys and a series of department-keys, arresting means for said department-keys, said means being normally out of operative relation with the department-keys, means requiring the operation of both a value and an initial key for placing said arresting means in operative relation with the said department-keys, and means under control of the department-keys for unlocking the main operating member.

31. In a cash-register, the combination with a normally locked operating-shaft, a series of value-keys, a series of initial-keys and a series of department-keys, arresting means for said department-keys, said means being normally out of operative relation with the department-keys, means requiring the operation of both a value and an initial key for placing said arresting means in operative relation with the said department-keys, and means under control of the department-keys for unlocking the operating-shaft.

32. In a cash-register, the combination with a series of value-keys, a series of initial-keys and a series of department-keys, arresting means for said initial and said department keys, said means being normally out of operative relation with their respective series of keys and means requiring the operation of a value-key for establishing operative relation between said arresting means and their respective keys.

33. In a cash-register, the combination with a normally locked main operating member, a series of value-keys, a series of initial-keys and a series of department-keys, arresting means for said initial and said department keys, said means being normally out of operative relation with their respective series of keys, means requiring the operation of a value-key for establishing operative relation between said arresting means and their respective keys, and mechanism under control of the department-keys for releasing the main operating member.

34. In a cash-register, the combination with a normally locked operating-shaft, a series of value-keys, a series of initial-keys and a series of department-keys, arresting means for said initial and said department keys, said means being normally out of operative relation with their respective series of keys, means requiring the operation of a value-key for establishing operative relation between said arresting means and their respective keys, and mechanism under control of the department-keys for releasing the operating-shaft.

35. In a cash-register, a series of value-setting elements, a series of initial-setting elements and a series of department-setting elements, arresting means for the initial and department setting elements, said means being normally out of operative relation with their respective series of setting elements, means controlled by the value-setting elements for establishing operative relation between the initial-setting elements and their arresting means, and means under control of the initial-setting elements for establishing operative relation between the department-setting elements and their respective arresting means.

36. In a cash-register, a series of value-keys, a series of initial-keys and a series of department-keys, arresting means for the initial and department keys, said means being normally out of operative relation with their respective series of keys, means controlled by the value-keys for establishing operative relation between the initial-keys and their arresting means, and means under control of the initial-keys for establishing operative relation between the department-keys and their respective arresting means.

37. In a cash-register, the combination with a normally locked main operating-lever, a series of value-keys, a series of initial-keys and a series of department-keys, arresting means for the initial and department keys, said means being normally out of operative relation with their respective series of keys, means controlled by the value-keys for establishing operative relation between the initial-keys and their arresting means, means under control of the initial-keys for establishing operative relation between the department-keys and their respective arresting means and means under control of the department-keys for unlocking the main operating-lever, said locking means being out of operative relation with the department-keys until both a value and an initial key has been depressed.

38. In a cash-register, a series of value-setting elements, a series of initial-setting elements and a change-key, said change-key being normally depressible, but unarrestable and ineffectual when depressed and means requiring the operation of both a value-setting element and an initial-setting element for rendering said change-key arrestable and effectual when depressed.

39. In a cash-register, a series of value-keys, a series of initial-keys and a change-key, said change-key being normally depressible, but unarrestable and ineffectual when depressed, and means requiring the operation of both a value-key and an initial-key for rendering said change-key arrestable and effectual when depressed.

40. In a cash-register, a normally locked main operating member, a series of value-keys, a series of initial-keys and a change-key, said change-key being normally depressible, but unarrestable and ineffectual when depressed, means requiring the operation of both a value-key and an initial-key for rendering said change-key arrestable and effectual when depressed, and means under control of the change-key for releasing the main operating member.

41. In a cash-register, the combination with a normally locked main operating-shaft, of a series of value-keys, a series of initial-keys and a series of department-keys, means requiring the depression of a key in each of said series for unlocking the main operating-shaft means for locking said keys when thus depressed and mechanism under control of the main operating-shaft for unlocking the depressed keys so that they may be restored to their normal positions.

42. In a cash-register, the combination with a normally locked main operating-shaft, of a series of value-keys, a series of initial-keys and a series of department-keys, means requiring the depression of a key in each of said series for unlocking the main operating-shaft, means for locking said keys when thus depressed mechanism under control of the main operating-shaft for unlocking the depressed keys so that they may be restored to their normal positions, and a recording device for producing a record showing which keys have been depressed.

43. In a cash-register, the combination with a normally locked main operating-shaft, of a series of value-setting elements, a series of initial-setting elements and a series of department-setting elements, means requiring the operation of an element in each of said series for unlocking the main operating member devices for locking said elements when thus operated and mechanism under control of the main operating member for releasing the operated elements so that they may be restored to their normal positions.

44. In a cash-register, a main operating member, a series of value and special setting elements, a detent for each series of setting elements, a movable member coöperating with each of said detents, locking means for one of said movable members, said locking means being controlled by all the value-setting elements and locking mechanism for said main operating member, said locking mechanism being controlled by said last-mentioned movable device.

45. In a cash-register, a main operating member, a series of value and special keys, a detent for each series of keys, a movable member coöperating with each of said detents, locking means for one of said movable members, said locking means being controlled by all the value-keys and locking mechanism for said main operating member, said locking mechanism being controlled by said last-mentioned movable device.

46. In a cash-register, a main operating-shaft, a series of value and special keys, a detent for each series of keys, a movable member coöperating with each of said detents, locking means for one of said movable members, said locking means being controlled by all the value-keys and locking mechanism for said main operating-shaft, said locking mechanism being controlled by said last-mentioned movable device.

47. In a structure as described, value-setting elements and special-setting elements, locking devices for said value and special setting elements, a transverse member having arms thereon engaged by the locking mechanism of the respective series of setting elements, one of said arms being adapted to hold the key-locking mechanism of the special-setting elements in inoperative position, cammed faces on the remaining arms engaged by the locking mechanism of the value-setting elements, whereby the movement of said value-setting-element-locking mechanism will oscillate the said transverse member and release the locking mechanism for the special-setting elements.

48. In a structure as described, value-keys, special keys, locking devices for said value and special keys, a transverse member having arms thereon engaged by the locking mechanism of the respective series of keys, one of said arms being adapted to hold the key-locking mechanism of the special keys in inoperative position, and cammed faces on the remaining arms engaged by the key-locking mechanism of the value-keys, whereby the movement of said value-key-locking mechanism will oscillate the said transverse member and release the locking mechanism for the special keys.

49. In a structure as described, a normally locked main operating member, value-keys, special keys, locking devices for said value and special keys, a transverse member having arms thereon engaged by the locking mechanism of the respective series of keys, one of said arms being adapted to hold the key-locking mechanism of the special keys in inoperative position, cammed faces on the remaining arms engaged by the key-locking mechanism of the value-keys whereby the movement of said value-key-locking mechanism will oscillate the said transverse member and release the locking mechanism for the special keys, and means requiring the operation of the locking mechanism for the special keys for unlocking the main operating member.

50. In a cash-register, a series of value-setting elements, a special-setting element, a locking device for holding the special-setting element in its operated position, means for normally holding said locking device out of operative relation with respect to the special-setting element, a detent for holding said means in its normal position, a member under control of the value-setting element, said member being adapted to move when a value-setting element is operated and means moved by said member for releasing the locking device for the special-setting element whereby said element may be locked in operated position.

51. In a cash-register, a series of value-keys, a series of special keys, a locking device for holding the special keys in operated position, means for normally holding said locking device out of operative relation with respect to the special keys, a detent for holding said means in its normal position, a member under control of the value-keys, said member being adapted to move when a value-key is operated and means moved by said member for releasing the locking device for the special keys whereby the same may be locked in operated position.

52. In a cash-register, a series of value-keys, a series of special keys, a locking device for holding the special keys in operated position, means for normally holding said locking device out of operative relation with respect to the special keys, a detent for holding said means in its normal position, a member under control of the value-keys, said member being adapted to move when a value-key is operated and a cam moved by said member for releasing the locking device for the special keys whereby the same may be locked in operated position.

53. In a machine as described, value and special setting elements, detents for said elements, intermediate members coöperating with said detents, a locking device for one of said intermediate members, said locking device being controlled entirely by the value-setting elements, a normally locked main operating member and connections between said locked intermediate member and said main operating member whereby the latter cannot be released until after the release of the said intermediate member.

54. In a machine as described, value and special keys, detents for said keys, intermediate members coöperating with said detents, a locking device for one of said intermediate members, said locking device being controlled entirely by the value-keys, a normally locked main operating member and connections between said locked intermediate members and said main operating member whereby the latter cannot be released until after the release of the said intermediate member.

55. In a machine as described, value, initial and department keys, detents for said keys, an intermediate member coöperating with each of said detents, a locking device for the intermediate member for the initial-keys, said locking device being controlled entirely by the value-keys, a locking device for the intermediate member of the department-keys, said locking device being controlled by the initial-keys, a normally locked main operating member and connections between said intermediate member for the department-keys and said main operating member whereby the latter is released upon the release of the said intermediate member for the department-keys.

56. In a cash-register, a bank of keys, a sliding plate controlled by said keys, a rock-shaft, means carried by said rock-shaft and engaging said plate whereby the movement of the plate results in rocking the shaft, a second sliding plate, a detent-arm carried by said rock-shaft and engaging with said second sliding plate, said detent normally holding said plate against movement but releasing the same when the shaft is rocked, a normally locked operating member, a detent for said operating member and connections between said detent and said second sliding plate.

57. In a cash-register, a bank of keys, a sliding plate controlled by said keys, a rock-shaft, means carried by said rock-shaft and engaging said plate whereby the movement of the plate results in rocking the shaft, a second sliding plate, a detent-arm carried by said rock-shaft and engaging with said second sliding plate, said detent normally holding said plate against movement but releasing the same when the shaft is rocked, a normally locked operating-shaft, a latch for holding said operating-shaft against rotation, and connections between said latch and said second sliding plate.

58. In a cash-register, a series of value-keys, a sliding plate controlled by said keys, a rock-shaft, means carried by said rock-shaft and engaging said plate whereby the movement of the plate results in rocking the shaft, a series of initial-keys, a sliding plate for the initial-keys, a detent-arm carried by said rock-shaft and engaging with said sliding plate for the initial-keys, said detent normally holding said plate against movement but releasing the same when the shaft is rocked upon the depression of a value-key, a normally locked operating member, a detent for said operating member and mediate connections between said detent and said sliding plate for the initial keys, the construction being such that when said plate is released and moved in one direction, the main operating member may be unlocked.

59. In a cash-register, a bank of keys, a detent-plate for said keys, a normally detained sliding plate coöperating with said detent-plate and holding the same out of operative position with respect to said keys, means for releasing and for moving said sliding plate and for permitting the detent-plate to move to operative position, and means on said detent-plate for arresting the movement of the sliding plate, said means being movable out of engagement with the sliding plate when one of said keys is depressed.

60. In a cash-register, a bank of keys, a detent-plate for said keys, a sliding plate coöp- erating with said detent-plate and normally holding the same out of operative position with respect to said keys, means for moving said sliding plate and for permitting the detent-plate to move to operative position, means on said detent-plate for arresting the movement of the sliding plate, said means being movable out of engagement with the sliding plate when one of said keys is depressed, a normally locked main operating member, and means for releasing said member after the sliding plate is disengaged from the detent-plate.

61. In a cash-register, a bank of keys, a detent-plate for said key, a sliding plate coöperating with said detent-plate and normally holding the same out of operative position with respect to said keys, means for moving said sliding plate and for permitting the detent-plate to move to operative position, means on said detent-plate for arresting the movement of the sliding plate, said means being movable out of engagement with the sliding plate when one of said keys is depressed, a normally locked operating-shaft, and means for releasing said shaft after the sliding plate is disengaged from the detent-plate.

62. In a cash-register, a series of value-keys, a series of normally depressible but unarrestable initial-keys, a series of depressible but unarrestable department-keys, a detent-plate for each of said series of keys, a sliding plate for each of said detent-plates, the sliding plates for the initial and department keys normally holding the detent-plates for said keys out of operative position with respect to their coöperating keys, a rock-shaft, cam-fingers carried by said rock-shaft and engaging with the sliding plates of the value-keys, a hook-detent carried by said shaft and engaging with the sliding plate for the initial-keys, said hook-detent being adapted to be lifted when a sliding plate for the value-key is moved, whereby the sliding plate for the initial-keys will be released and the detent-plate for the initial-keys will be brought into operative position, means on the detent-plate for the initial-keys for holding its corresponding sliding plate in an intermediate position, a cam-finger carried by said shaft and engaging with the sliding plate for the initial-keys, a hook-detent connected with said cam-finger and engaging the sliding plate for the department-keys, means whereby the depression of an initial-key will release the sliding plate for said keys so that it can move from its intermediate position, which movement will rock the cam-finger and the hook-detent for the sliding plate for the department-keys so that said latter sliding plate can move to an intermediate position, means whereby the depression of a department-key will release the sliding plate for said keys so that said sliding plate can move from its intermediate position, a main operating member, means for normally locking said main operating member and connections between said means and the sliding plate for the department-keys.

63. In a cash-register, a series of value-keys, a series of normally depressible but unarrestable initial-keys, a series of depressible but unarrestable department-keys, a detent-plate for each of said series of keys, a sliding plate for each of said detent-plates, the sliding plates for the initial and department keys normally holding the detent-plates for said keys out of operative position with respect to their coöperating keys, a rock-shaft, cam-fingers carried by said rock-shaft and engaging with the sliding plates of the value-keys, a hook-detent carried by said shaft and engaging with the sliding plate for the initial-keys, said hook-detent being adapted to be lifted when a sliding plate for the value-keys is moved, whereby the sliding plate for the initial-keys will be released and the detent-plate for the initial-keys will be brought into operative position, means on the detent-plate for the initial-keys for holding its corresponding sliding plate in an intermediate position, a cam-finger carried by said shaft and engaging with the sliding plate for the initial-keys, a hook-detent connected with said cam-finger and engaging the sliding plate for the department-keys, means whereby the depression of a department-key will release the sliding plate for said keys so that said sliding plate can move from its intermediate position, a main operating-shaft, means for normally locking said shaft and connections between said means and the sliding plate for the department-keys, whereby the final movement of said plate will release the shaft.

64. In a cash-register, a series of value-keys, a series of normally depressible but unarrestable initial-keys, a series of depressible but unarrestable department-keys, a detent-plate for each of said series of keys, a sliding plate for each of said detent-plates, the sliding plates for the initial and department keys normally holding the detent-plates for said keys out of operative position with respect to their coöperating keys, a rock-shaft, cam-fingers carried by said rock-shaft and engaging with the sliding plates of the value-keys, a hook-detent carried by said shaft and engaging with the sliding plate for the initial-keys, said hook-detent being adapted to be lifted when a sliding plate for the value-keys is moved whereby the sliding plate for the initial-keys will be released and the detent-plate for the initial-keys will be brought into operative position, means on the detent-plate for the initial-keys for holding its corresponding sliding plate in an intermediate position, a cam-finger carried by said shaft and engaging with the sliding plate for the initial-keys, a hook-detent connected with said cam-finger and engaging the sliding plate for the department-keys, means whereby the depression of an initial key will release the sliding plate for said keys so that it can move from its intermediate position which movement will rock the cam-finger and the hook-detent for the sliding plate for the department-keys so that said latter sliding plate can move to an intermediate position, means whereby the depression of a department-key will release the sliding plate for said keys so that said sliding plate can move from its intermediate position, a main operating member, means for normally locking said main operating member, connections between said means and the sliding plate for the department-keys, and a recording device for producing a record showing what keys have been depressed.

65. In a cash-register, a series of value-keys, a series of initial-keys, and a series of department-keys, interlocking mechanism between said series of keys for requiring the operation of both a value and an initial key in advance of the operation of a department-key, a main operating-shaft, a registering device, connections between the value-keys and the registering device whereby when the main shaft is turned the registering-wheels will also be turned to register the values of the depressed value-keys and means operated by certain of the keys of the department series for preventing the operation of the registering device when the main shaft is rotated.

66. In a cash-register, a series of value-keys, a series of initial-keys, and a series of department-keys, interlocking mechanism between said series of keys for requiring the operation of both a value and an initial key in advance of the operation of a department-key, a normally locked main operating-shaft, means for releasing said shaft when a department-key is operated, a crank for turning said shaft, a registering device, connections between the value-keys and the registering device whereby when the main shaft is turned the registering-wheels will also be turned to register the values of the depressed value-keys and means operated by certain of the keys of the department series for preventing the operation of the registering device when the main shaft is rotated.

67. In a cash-register, a series of value-keys, a series of initial-keys, and a series of department-keys, interlocking mechanism between said series of keys for requiring the operation of both a value and an initial key in advance of the operation of a department-key, a main operating-shaft, a crank for turning said shaft, a registering device, connections between the value-keys and the registering device whereby when the main shaft is turned the registering-wheels will also be turned to register the values of the depressed value-keys, means operated by certain of the keys of the department series for preventing the operation of the registering device when the main shaft is rotated, and a recording device for producing a record showing the transaction that was not added on the registering device.

68. In a machine for registering the amounts of certain classes of transactions, such as cash sales, and for recording the amounts of transactions of other classes, the combination with the operating mechanism, of a register adapted to be operated thereby for registering the amounts of cash transactions, printing means for printing the amounts of all transactions, value-keys for controlling the operation of the registering and printing mechanisms, initial-keys for causing the printing mechanism to record a character designating the clerk who has operated the machine, a series of department-keys for causing the printing mechanism to record a character showing the kind of a transaction made, interlocking devices between the operating mechanism and the department-keys for requiring the operation of a department-key before the machine can be operated, interlocking mechanism between the value, the initial and the department keys requiring the operation of both a value and an initial key before the department-key can be operated to release the operating mechanism and means connected with certain of the keys of the department series for throwing or maintaining the register out of operation when one of said certain department-keys is depressed.

69. In a machine for registering the amounts of certain classes of transactions, such as cash sales, and for recording the amounts of transactions of all other classes, the combination with a rotatable shaft, of a register adapted to be operated thereby for registering the amounts of cash transactions, printing means for printing the amounts of all transactions, value-keys for controlling the operation of the registering and printing mechanisms, initial-keys for causing the printing mechanism to record a character designating the clerk who has operated the machine, a series of department-keys for causing the printing mechanism to record a character showing the kind of a transaction made, interlocking devices between the rotatable shaft and the department-keys for requiring the operation of a department-key before the shaft can be rotated, interlocking mechanism between the value, the initial and the department keys requiring the operation of both a value and an initial key before the department-keys can be operated to release the rotatable shaft, and means connected with certain of the keys of the department series for throwing or maintaining the register out of operation when one of said certain department-keys is depressed.

70. In a registering-machine, an operating mechanism, a register that is adapted to be operated by said mechanism, an indicating and a printing device, said devices being operated by said mechanism to indicate the value and character of every transaction, a series of value-setting elements, a series of clerk's-setting elements and a series of department-setting elements, said elements controlling the operation of the registering, indicating and printing mechanisms, and interlocking devices between the various series of setting elements requiring the operation of said elements in a certain predetermined sequence.

71. In a registering-machine, an operating mechanism, a register that is adapted to be operated by said mechanism, an indicating and a printing device, said devices being operated by said mechanism to indicate the value and character of every transaction, a series of value-setting elements, a series of clerk's-setting elements and a series of department-setting elements, said elements controlling the operation of the registering, indicating and printing mechanisms, interlocking devices between the various series of setting elements requiring the operation of said elements in a certain predetermined sequence, and means controlled by certain of the department-setting elements for throwing or maintaining the register out of operation.

72. In a registering-machine, a normally locked main operating mechanism, a register that is adapted to be operated by said mechanism, an indicating and a printing device, said devices being operated by said mechanism to indicate the value and character of every transaction, as well as the initial of the person operating the machine, a series of value-keys, a series of clerk's-initial keys, and a series of department-keys, said keys controlling the operation of the registering, indicating and printing mechanisms, interlocking devices between the various series of keys requiring the operation of said keys in the order of value-keys, clerk's-initial keys and department-keys, and means controlled by the department-keys for unlocking the main operating mechanism.

73. In a keyboard mechanism, a series of value-keys, a series of initial-keys, a series of department-keys, and locking means to prevent the effectual operation of a department-key until a value-key and an initial-key have been depressed.

74. In a cash-register, a value-setting element, a clerk's-setting element, a transaction-setting element, and interlocking means between said elements for preventing their effectual operation in other than in a predetermined order.

75. In a cash-register, the combination with a series of amount-setting elements, of a clerk's-setting element, a special-transaction-setting element, locks intermediate the amount-setting elements and clerk's-setting element, compelling a certain sequence of operation thereof and locks intermediate the special-transactions-setting element and the clerk's-setting element, compelling a certain sequence of operation thereof.

76. In a cash-register, the combination of a series of adding-wheels, a main operating member, a series of value-keys, a series of initial-keys, a series of department-keys and locking means controlled by the department-keys to compel the depression of a department-key after the initial and value keys have been depressed before the main operating member can be operated.

77. In a cash-register, the combination with a series of adding-wheels, an oscillatory indicator, and a series of numbered or value keys, of a series of initial and department keys and locking means whereby a department-key cannot be effectually operated until both a value-key and an initial-key have been operated.

In testimony whereof I hereunto affix my signature in the presence of two witnesses.

HENRY S. HALLWOOD.

Witnesses:
EMILIE SMITH,
G. M. GRIDLEY.